United States Patent
Kobayashi

(10) Patent No.: US 8,858,340 B2
(45) Date of Patent: Oct. 14, 2014

(54) SERVER DEVICE, AND NON-TRANSITORY COMPUTER-READABLE STORAGE MEDIUM STORING GAME PROGRAM

(71) Applicant: DeNA Co., Ltd., Tokyo (JP)

(72) Inventor: Shigenori Kobayashi, Tokyo (JP)

(73) Assignee: Dena Co., Ltd, Tokyo (JP)

( * ) Notice: Subject to any disclaimer, the term of this patent is extended or adjusted under 35 U.S.C. 154(b) by 0 days.

(21) Appl. No.: 14/216,389

(22) Filed: Mar. 17, 2014

(65) Prior Publication Data

US 2014/0200082 A1 Jul. 17, 2014

Related U.S. Application Data

(63) Continuation of application No. 13/950,096, filed on Jul. 24, 2013, now Pat. No. 8,678,933.

(30) Foreign Application Priority Data

Aug. 3, 2012 (JP) ................................. 2012-173193

(51) Int. Cl.
*A63F 13/12* (2006.01)
*A63F 13/30* (2014.01)

(52) U.S. Cl.
CPC ...................................... *A63F 13/12* (2013.01)
USPC .............................................. 463/42; 463/31

(58) Field of Classification Search
USPC ................................................ 463/31, 40–42
See application file for complete search history.

(56) References Cited

U.S. PATENT DOCUMENTS

| | | | |
|---|---|---|---|
| 6,993,500 B2 | 1/2006 | Ishihara | |
| 7,314,407 B1 | 1/2008 | Pearson | |
| 2001/0039206 A1 | 11/2001 | Peppel | |

(Continued)

FOREIGN PATENT DOCUMENTS

| | | | |
|---|---|---|---|
| JP | 2005-137809 A | 6/2005 | |
| JP | 2007-215705 A | 8/2007 | |

(Continued)

OTHER PUBLICATIONS

Gamasutra—The Art & Business of Making Games—titled: Why "Kompu Gacha" Was Banned—http://www.gamasutra.com/blogs/BetableBlog/20120525/171124/Why_quotKompu_Gachaquot_Was_Banned.php—May 25, 2012.*

(Continued)

*Primary Examiner* — Damon Pierce
(74) *Attorney, Agent, or Firm* — Procopio, Cory, Hargreaves & Savitch LLP

(57) ABSTRACT

A server device according to an embodiment is connected to a plurality of player terminals to communicate information with the player terminals. The server device includes: a storage unit configured to store game content information, the game content information being configured to have special numbers at a predetermined interval in serial number order; a providing unit configured to select the same number of pieces of game content as the number of the predetermined interval, and to provide the selected pieces of game content at a time; a provision notice information generating unit configured to generate provision notice information for notifying in advance of whether a piece of game content with a special number is to be provided; and an image data generating unit configured to generate image data for displaying a game screen on a display unit of the player terminal before providing the pieces of game content.

4 Claims, 15 Drawing Sheets

(56) References Cited

U.S. PATENT DOCUMENTS

| | | |
|---|---|---|
| 2003/0107173 A1 | 6/2003 | Satloff et al. |
| 2006/0040747 A1 | 2/2006 | Tao et al. |
| 2007/0082739 A1 | 4/2007 | Tsubota |

FOREIGN PATENT DOCUMENTS

| | | |
|---|---|---|
| JP | 2008-264183 | 6/2008 |
| JP | 2010-104796 | 5/2010 |
| JP | 2010-104796 A | 5/2010 |

OTHER PUBLICATIONS

Kantan Games, Inc.—titled: Box Gacha: GREE and DeNA Found a Replacement for Kompu Gacha [Social Games]—http://www.serkantoto.com/2012/11/01/kompu-gacha-package-box-gacha/—Nov. 1, 2012.*

Japanese Patent Application No. 2013-053172: Office Action mailed on Nov. 5, 2012.

Japanese Patent Application No. 2013-053172: Decision to Grant mailed on Dec. 3, 2013.

"Gundam card collection, The amount of money related to Gacha is made substantially explicit: Social game is examined 12", GameCast iPhone, Jun. 10, 2012, [online], [searched on Oct. 30, 2013], <URL: http://www.gamecast-blog.com/archives/65683438.html>.

Japanese Patent Application No. 2012-173193: Office Action mailed on Dec. 13, 2012.

Japanese Patent Application No. 2013-053172: Office Action mailed on Nov. 5, 2013.

"Substantially Explicitly Showing Price of Gacha for Gundam Card Collection: Looking at Social Games 12," [online], GameCast iPhone, Jun. 10, 2012, [Retrieved on Oct. 30, 2013], <URL: http://www.gamecast-blog.com/archives/65683438.html>.

* cited by examiner

FIG. 4

| CARD ID | CHARACTER NAME | CHARACTER IMAGE | RARITY | INITIAL (Lv. 1) ATTACK POWER | INITIAL (Lv. 1) DEFENSE POWER |
|---|---|---|---|---|---|
| 0001 | WARRIOR A | | COMMON | 15 | 8 |
| 0002 | WARRIOR A | | UNCOMMON | 20 | 15 |
| 0003 | WARRIOR A | | RARE | 100 | 60 |
| 0004 | WARRIOR A | | SUPER-RARE | 200 | 180 |
| 0011 | WARRIOR B | | COMMON | 10 | 5 |
| 0012 | WARRIOR B | | UNCOMMON | 15 | 10 |
| 0013 | WARRIOR B | | RARE | 80 | 50 |
| ... | ... | ... | ... | ... | ... |
| 2591 | MAGICIAN Z | | COMMON | 20 | 30 |
| 2592 | MAGICIAN Z | | UNCOMMON | 50 | 75 |
| 2593 | MAGICIAN Z | | RARE | 60 | 100 |
| 2594 | MAGICIAN Z | | SUPER-RARE | 150 | 300 |

FIG. 5

| PLAYER ID | FRIEND PLAYER ID | COINS | CONSUMPTION POINTS | OWNED CARD INFORMATION |
|---|---|---|---|---|
| 1 | 5, 8 | 0 | 3 | OWNED CARD INFORMATION (1) |
| 2 | NONE | 500 | 2 | OWNED CARD INFORMATION (2) |
| 3 | 4, 6 | 700 | 2 | OWNED CARD INFORMATION (3) |
| 4 | 3, 6 | 1000 | 0 | OWNED CARD INFORMATION (4) |
| 5 | 1, 6 | 100 | 1 | OWNED CARD INFORMATION (5) |
| 6 | 3, 4, 5 | 3000 | 0 | OWNED CARD INFORMATION (6) |
| . | . | . | . | . |
| . | . | . | . | . |
| . | . | . | . | . |

FIG. 6

OWNED CARD INFORMATION (3)
OWNED CARD INFORMATION (2)
OWNED CARD INFORMATION (1)

| OWNED CARD ID | LEVEL | ATTACK POWER | DEFENSE POWER | ACQUISITION DATE/TIME |
|---|---|---|---|---|
| 0011 | LV.3 | 15 | 10 | 2012/2/13 10:00 |
| 0211 | LV.4 | 20 | 23 | 2012/2/13 12:00 |
| 0133 | LV.1 | 70 | 45 | 2012/2/14 11:30 |
| 0201 | LV.4 | 22 | 40 | 2012/2/15 18:00 |
| 0072 | LV.7 | 60 | 50 | 2012/2/16 13:30 |
| 0094 | LV.1 | 300 | 200 | 2012/2/16 19:00 |
| ... | ... | ... | ... | ... |

SERVER DEVICE, AND NON-TRANSITORY COMPUTER-READABLE STORAGE MEDIUM STORING GAME PROGRAM

CROSS-REFERENCE TO RELATED APPLICATION(S)

This application claims the foreign priority benefit of Japanese Patent Application No. 2012-173193, filed Aug. 3, 2012, and Japanese Patent Application No. 2013-053172, filed Mar. 15, 2013, as well as being a continuation of U.S. patent application Ser. No. 13/950,096, filed Jul. 24, 2013. The disclosures of these applications are hereby incorporated by reference in their entirety.

BACKGROUND OF THE INVENTION

1. Field of the Invention

The present invention relates to a server device and a non-transitory computer-readable storage medium storing game program.

2. Description of the Related Art

A game system in which a player plays a game using game content such as character cards is known (for example, Japanese Patent Application Laid-Open No. 2008-264183).

SUMMARY OF THE INVENTION

In such a game system, game content used in a game is provided to a player. Here, if the player is allowed to see, before game content is provided, information about the game content in advance without any constrains, then the player frequently accesses a server to see the information, increasing server load.

The present invention has been made in view of such a problem, and an object of the present invention is therefore to reduce server load.

The main aspect of the present invention to solve the above-described problem is directed to a server device connected to a plurality of player terminals so as to communicate information with the player terminals, the server device including:

a storage unit configured to store game content information in which rarity levels are set to be respectively associated with a plurality of pieces of game content provided with serial numbers, the game content information being configured to have special numbers at a predetermined interval in serial number order, and being configured such that rarity levels set for pieces of game content with the special numbers are higher than or equal to rarity levels set for pieces of game content with numbers other than the special numbers;

a providing unit configured to select, in response to a request from each of the player terminals, the same number of pieces of game content as the number of the predetermined interval, in numerical order from among the plurality of pieces of game content by referring to the game content information, and to provide the selected pieces of game content at a time;

a provision notice information generating unit configured to generate provision notice information for notifying in advance of whether a piece of game content with a special number is to be provided; and an image data generating unit configured to generate, in response to a request from a player terminal having satisfied a predetermined condition, image data for displaying a game screen on a display unit of the player terminal before providing the pieces of game content, the game screen containing the provision notice information, wherein a numerical value of a maximum number among the serial numbers provided to the pieces of game content is obtained by adding the number of the plurality of pieces of game content provided at a time by the providing unit to a numerical value of a maximum special number and then subtracting 1 from the added numerical value, and when the providing unit provides, at a time, a plurality of pieces of game content including a piece of game content with the maximum special number, the providing unit provides pieces of game content with numbers from one subsequent to the maximum special number to the maximum number.

Other features of the present invention will become apparent from the description of the present specification and the accompanying drawings.

According to the present invention, the server load can be reduced.

BRIEF DESCRIPTION OF THE DRAWINGS

FIG. 4 is a diagram showing an exemplary data structure of card information;

FIG. 5 is a diagram showing an exemplary data structure of player information;

FIG. 6 is a diagram showing an exemplary data structure of owned card information;

DETAILED DESCRIPTION OF THE INVENTION

Figure 1:
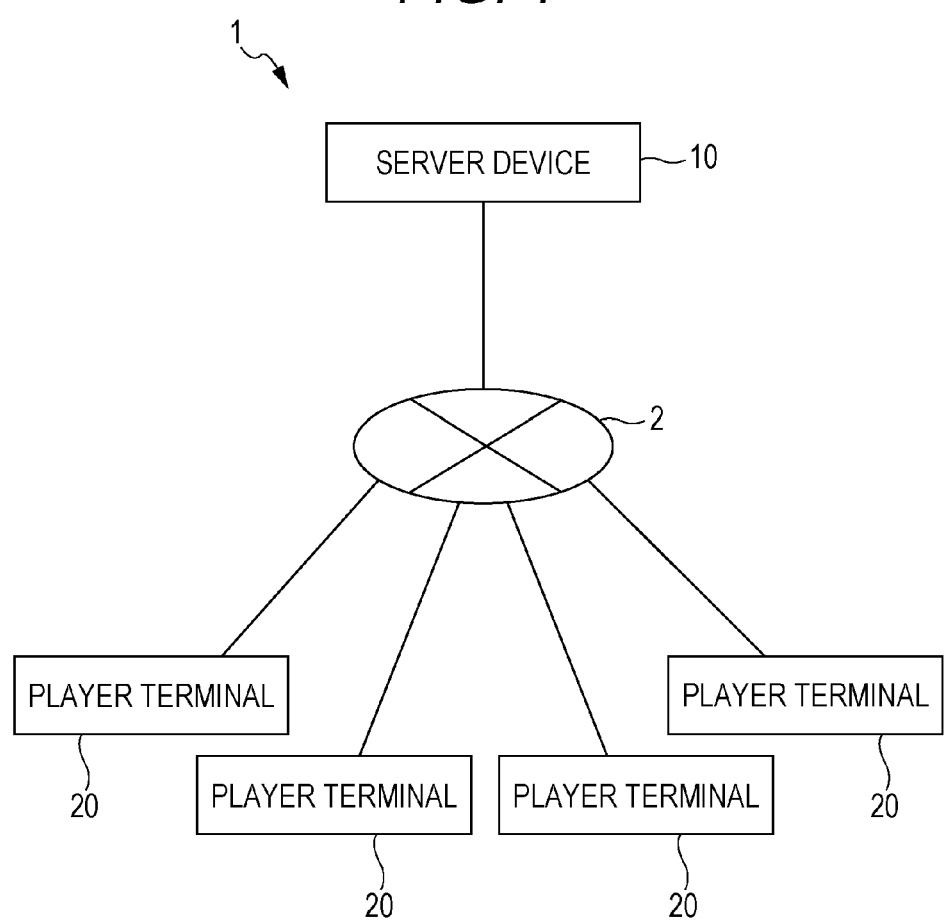
FIG. 1 is a diagram showing an exemplary overall configuration of a game system.

At least the following matters will become apparent from the description of the present specification and the accompanying drawings.

Specifically, there is provided a server device connected to a plurality of player terminals so as to communicate information with the player terminals, the server device including:

a storage unit configured to store game content information in which rarity levels are set to be respectively associated with a plurality of pieces of game content provided with serial numbers, the game content information being configured to have special numbers at a predetermined interval in serial number order, and being configured such that rarity levels set for pieces of game content with the special numbers are higher than or equal to rarity levels set for pieces of game content with numbers other than the special numbers;

a providing unit configured to select, in response to a request from each of the player terminals, the same number of pieces of game content as the number of the predetermined interval, in numerical order from among the plurality of pieces of game content by referring to the game content information, and to provide the selected pieces of game content at a time;

a provision notice information generating unit configured to generate provision notice information for notifying in advance of whether a piece of game content with a special number is to be provided; and an image data generating unit configured to generate, in response to a request from a player terminal having satisfied a predetermined condition, image data for displaying a game screen on a display unit of the player terminal before providing the pieces of game content, the game screen containing the provision notice information, wherein a numerical value of a maximum number among the serial numbers provided to the pieces of game content is obtained by adding the number of the plurality of pieces of game content provided at a time by the providing unit to a numerical value of a maximum special number and then subtracting 1 from the added numerical value, and when the providing unit provides, at a time, a plurality of pieces of game content including a piece of game content with the maximum special number, the providing unit provides pieces of game content with numbers from one subsequent to the maximum special number to the maximum number.

According to such a server device, by limiting players to whom provision notice information is shown in advance to those having satisfied the predetermined condition, frequent access to the server is prevented, enabling to reduce server load.

Also, according to such a server device, by selecting the same number of pieces of game content as the number of the predetermined interval and providing the selected pieces of game content at a time, a player can securely acquire a piece of game content with a special number.

Furthermore, according to such a server device, when a plurality of pieces of game content including a piece of game content with the maximum special number is provided at a time, pieces of game content with numbers exceeding the maximum special number can also be provided. Thus, shortage of pieces of game content to be provided can be avoided.

In addition, in the server device, the storage unit may store virtual currency owned by each player, and the predetermined condition may be that a player acquires the piece of game content provided by the providing unit, by consuming the virtual currency.

According to such a server device, by limiting players to whom provision notice information is shown in advance to those having acquired a piece of game content by consuming the virtual currency, frequent access to the server is prevented, making it possible to reduce server load.

In addition, there is provided a non-transitory computer-readable storage medium storing a game program that causes a server device, connected to a plurality of player terminals so as to communicate information with the player terminals, to implement:

storing, in a storage unit, game content information in which rarity levels are set to be respectively associated with a plurality of pieces of game content provided with serial numbers, the game content information being configured to have special numbers at a predetermined interval in serial number order, and being configured such that rarity levels set for pieces of game content with the special numbers are higher than or equal to rarity levels set for pieces of game content with numbers other than the special numbers;

selecting, in response to a request from each of the player terminals, the same number of pieces of game content as the number of the predetermined interval, in numerical order from among the plurality of pieces of game content by referring to the game content information, and providing the selected pieces of game content at a time;

generating provision notice information for notifying in advance of whether a piece of game content with a special number is to be provided; and generating, in response to a request from a player terminal having satisfied a predetermined condition, image data for displaying a game screen on a display unit of the player terminal before providing the pieces of game content, the game screen containing the provision notice information, wherein a numerical value of a maximum number among the serial numbers provided to the pieces of game content is obtained by adding the number of the plurality of pieces of game content provided at a time to a numerical value of a maximum special number and then subtracting 1 from the added numerical value, and when the providing provides, at a time, a plurality of pieces of game content including a piece of game content with the maximum special number, the providing provides pieces of game content with numbers from one subsequent to the maximum special number to the maximum number.

According to such a non-transitory computer-readable storage medium storing a game program, the server load can be reduced.

In addition, in the non-transitory computer-readable storage medium storing a game program, the storing may store, in the storage unit, virtual currency owned by each player, and the predetermined condition may be that a player acquires pieces of game content provided by consuming the virtual currency.

Embodiment

<Configuration of Game System 1>

FIG. 1 is a diagram showing an example of an overall configuration of a game system 1 according to the present embodiment. The game system 1 is to provide a player with various types of services regarding a game through a network 2 (e.g., the Internet), and includes a server device 10 and a plurality of player terminals 20.

<Configuration of Server Device 10>

Figure 2:
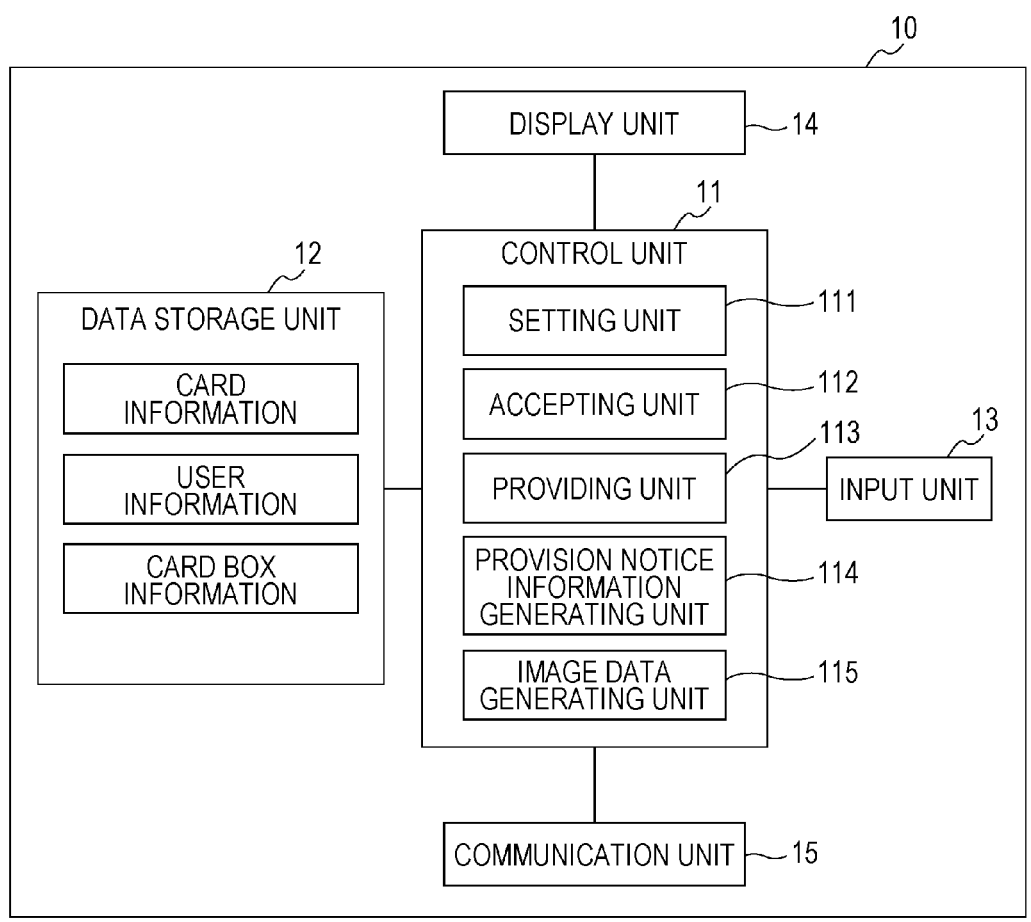
FIG. 2 is a block diagram showing a functional configuration of a server device.

FIG. 2 is a block diagram showing a functional configuration of the server device 10 according to the present embodiment. The server device 10 is an information processing apparatus (e.g., a workstation and a personal computer) used when a system administrator, etc., operates and manages game services. When the server device 10 receives various types of commands (requests) from the player terminals 20, the server device 10 can distribute game programs operable on the player terminals 20, web pages created in markup language (HTML, etc.) conforming to the specifications of the player terminals 20, and the like. The server device 10 has a control unit 11, a data storage unit 12, an input unit 13, a display unit 14, and a communication unit 15.

The control unit 11 passes data between the units and performs overall control of the server device 10. The control unit 11 is implemented by a central processing unit (CPU)

executing a program stored in a predetermined memory. The control unit 11 of the present embodiment includes a setting unit 111, an accepting unit 112, a providing unit 113, a provision notice information generating unit 114, and an image data generating unit 115.

The setting unit 111 has a function of performing the process of setting the contents of card boxes, i.e., the contents of game content provided to a player (the attributes (rarity levels), order (nice round numbers), etc., of game content to be provided).

The accepting unit 112 has a function of performing the process of accepting various types of operation commands (requests) issued by a player, from the player terminals 20 through the network 2.

The providing unit 113 has a function of performing the process of providing a player with game content used in a game. The game content includes, for example, game cards, figures, etc., associated with characters, etc., or items that can be used in the game, such as tools and abilities.

The provision notice information generating unit 114 has a function of performing the process of generating provision notice information for notifying in advance of information about game content to be provided to a player. The provision notice information is, for example, information for notifying in advance of whether special game content is to be provided.

The image data generating unit 115 has a function of performing the process of generating image data for allowing the player terminal 20 to display an operation screen and a game screen where a player plays a game.

The data storage unit 12 has a read only memory (ROM) which is a read-only storage area having a system program stored therein, and a random access memory (RAM) which is a rewritable storage area used as a work area for computing processes performed by the control unit 11. The data storage unit 12 is implemented by, for example, a nonvolatile storage device such as a flash memory or a hard disk. The data storage unit 12 of the present embodiment stores card information which is information about game cards used in games, player information which is information about players, and card box information which is information about virtual card boxes, each containing a plurality of game cards arranged in the order in which the game cards are provided.

The input unit 13 is to input various types of data (e.g., card information) by the system administrator, etc. The input unit 13 is implemented by, for example, a keyboard and a mouse.

The display unit 14 is to display an operation screen for the system administrator, based on an instruction from the control unit 11. The display unit 14 is implemented by, for example, a liquid crystal display (LCD).

The communication unit 15 is to perform communication with the player terminals 20. The communication unit 15 has a function as a receiving unit that receives various types of data and signals transmitted from the player terminals 20, and a function as a transmitting unit that transmits various types of data and signals to the player terminals 20 in response to instructions from the control unit 11. The communication unit 15 is implemented by, for example, a network interface card (NIC).

<Configuration of Player Terminal 20>

Figure 3:
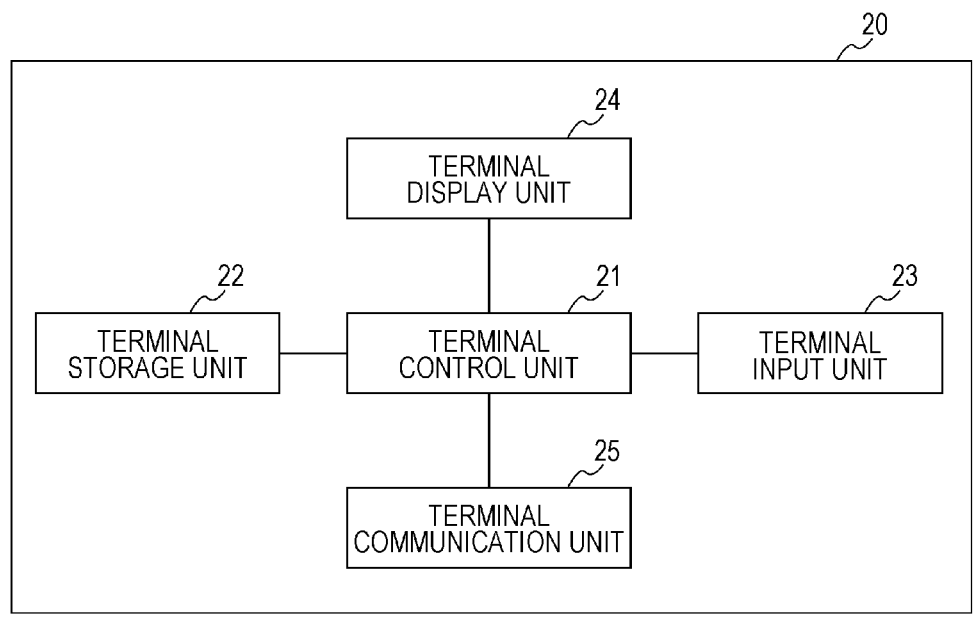
FIG. 3 is a block diagram showing a functional configuration of a player terminal.

FIG. 3 is a block diagram showing a functional configuration of the player terminal 20. The player terminal 20 of the present embodiment is an information processing apparatus (e.g., a mobile phone terminal or a smartphone) used by a player when playing a game, and can request the server device 10 to distribute various types of information about the game (a game program, web pages, etc.). The player terminal 20 has a web browser function of allowing the player to browse web pages, and thus, can display web pages (game play images, etc.) distributed from the server device 10 on a screen. The player terminal 20 includes a terminal control unit 21, a terminal storage unit 22, a terminal input unit 23, a terminal display unit 24, and a terminal communication unit 25.

The terminal control unit 21 passes data between the units and performs overall control of the player terminal 20. The terminal control unit 21 is implemented by a central processing unit (CPU) executing a program stored in a predetermined memory. Note that the terminal control unit 21 of the present embodiment also functions as a screen display control unit that controls the display mode of a game screen displayed on the terminal display unit 24.

The terminal storage unit 22 is connected via a bus to the terminal control unit 21, and performs the process of referring to, reading, and rewriting data stored therein, in response to instructions from the terminal control unit 21. The terminal storage unit 22 is implemented by, for example, a flash memory or a hard disk.

The terminal input unit 23 is to perform various types of operations (game operations, etc.) by the player. The terminal input unit 23 is implemented by, for example, operation buttons and a touch panel.

The terminal display unit 24 is to display game screens (game images, operation images, etc.) in response to instructions from the terminal control unit 21. The terminal display unit 24 is implemented by, for example, a liquid crystal display (LCD).

The terminal communication unit 25 functions as a transmitting and receiving unit for transmitting and receiving various types of information to/from the server device 10 through the network 2. The terminal communication unit 25 is implemented by, for example, a network interface card (NIC).

<Data Structure>

FIG. 4 is a diagram showing an exemplary data structure of card information stored in the data storage unit 12 of the server device 10. The card information includes items (fields) such as a card ID, a character name, a character image, rarity, attack power, and defense power. The card ID is identification information that identifies a game card. The character name is information indicating the display name of a character. The character image is image data of the character. The rarity is a parameter indicating the rarity level of the character. In the present embodiment, four levels of rarity ("common"→"uncommon"→"rare"→"super-rare") are set for characters (game cards). Specifically, a game card with a card ID whose last digit is "1" is set to "common". A game card with a card ID whose last digit is "2" is set to "uncommon". A game card with a card ID whose last digit is "3" is set to "rare". A game card with a card ID whose last digit is "4" is set to "super-rare". The attack power, defense power, etc., of the character are parameters indicating ability values set for the character.

FIG. 5 is a diagram showing an exemplary data structure of player information stored in the data storage unit 12 of the server device 10. The player information includes items such as a player ID, a friend player ID, coins, consumption points, and owned card information. The player ID is identification information that identifies a player. The friend player ID is information indicating other players registered in a player's friend list. The coins is information indicating the amount of coins owned by the player and is updated, for example, when the player gains or consumes a coin. The coins are an example of virtual currency used in games. The consumption points (battle energy) is information required when the player battles against an enemy character. For the consumption points, 1 point or more is consumed upon the player starting battle, and the consumption points are recovered by the passage of time, the use of a recovery item, etc. The owned card information is information indicating game cards owned by the player (hereinafter, also referred to as the owned cards).

FIG. 6 is a diagram showing an exemplary data structure of owned card information. The owned card information includes items such as an owned card ID and the level, attack power, defense power, acquisition date/time, etc., of the owned card. The owned card ID is identification information that identifies an owned card. The level, attack power, defense power, and physical strength of the owned card are parameters indicating ability values set for a character associated with the owned card. These various types of parameters are updated according to the result of a battle game, etc. The acquisition date/time is information indicating the date and time when the player has acquired the owned card.

Figure 7:
FIG. 7 is a diagram showing an exemplary data structure of card box information.

FIG. 7 is a diagram showing an exemplary data structure of card box information stored in the data storage unit 12 of the server device 10. The card box information is an example of game content information, and is information defining a virtual card box where game cards to be provided to players are put together in a set every predetermined number of game cards. The card box information is configured such that rarities indicating rarity levels are set to be respectively associated with a plurality of game cards (card IDs) provided with serial numbers, and that the rarities set for game cards with special numbers are higher than or equal to the rarities set for game cards with numbers other than the special numbers. In the present embodiment, card box information is configured such that 309 game cards provided with serial numbers from No. 1 to No. 309 are arranged in numerical order, and a game card selected in numerical order from the card box information is provided to a player. Special numbers are set at every predetermined interval such as Nos. 10, 20, 30 . . . , and rare cards are set for the special numbers. In addition, No. 300 is also set as a special number, and a super-rare card is set for this special number. For those numbers other than the special numbers, common cards, uncommon cards, rare cards, etc., are set. As such, the configuration is such that the rarities set for game cards with the special numbers are higher than or equal to the rarities set for game cards with numbers other than the special numbers. Note that the configuration may be such that the rarities set for game cards with the special numbers are higher than the rarities set for game cards with numbers other than the special numbers.

<Summary of Game>

Here, a summary of a game provided by the game system 1 of the present embodiment will be described. The game system 1 provides a battle game played using game cards (virtual cards used in a virtual space in the game) which are an example of game content.

(Battle Game)

In the game system 1 of the present embodiment, a player can own a plurality of game cards associated with game characters. The player can play a battle game by using a game card (character) selected from among the plurality of his/her owned game cards, and consuming the consumption points (battle energy) set for the player. The control unit 11 determines an enemy character that battles against the character selected by the player, and determines the winning or losing of the battle game between the characters, based on various types of parameters (attack power, defense power, physical strength/vitality, etc.) set for the characters and the number of consumption points consumed.

(Provision of Game Cards)

In the game system 1 of the present embodiment, a game card is provided to a player when winning a battle against an enemy character or when playing a lottery game, so-called "Gacha Gacha" (registered trademark). The player can own the provided game card and can also play the above-described battle game using the game card.

In the present embodiment, as an example of a lottery game providing game cards, "nice round number gacha" is played. In the "nice round number gacha", a game is played in which a game card selected in numerical order from a virtual card box that contains a plurality of game cards provided with serial numbers is provided to a player requesting for a game card. When a game card with a special number, so-called "nice round number" (e.g., No. 100 or 777), is selected, a special game card is provided to the player. Since a plurality of players shares this virtual card box, they use their strategies to aim at acquiring special cards with nice round numbers.

Figure 8:
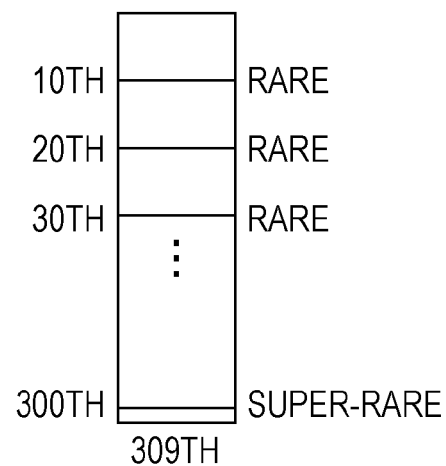
FIG. 8 is a conceptual diagram of a card box.

FIG. 8 is a conceptual diagram of a virtual card box containing game cards which are provided in nice round number gacha. The card box of the present embodiment contains 309 game cards. Rare cards are set for the nice round numbers of every 10 game cards, such as the 10th, 20th, and 30th cards, and a super-rare card is set for the nice round number of the 300th card.

Players can play nice round number gacha by consuming a predetermined number of coins (virtual currency). In the present embodiment, players can select either normal nice round number gacha (hereinafter, called "normal gacha") or special nice round number gacha (hereinafter, called "10-consecutive gacha") and play the selected gacha. In the normal gacha, one nice round number gacha is played by consuming one coin, and one game card selected in numerical order from the card box is provided to a player. In the 10-consecutive gacha, one nice round number gacha is played by consuming 10 coins, and 10 game cards selected in numerical order from the card box are provided at a time.

Figure 9:
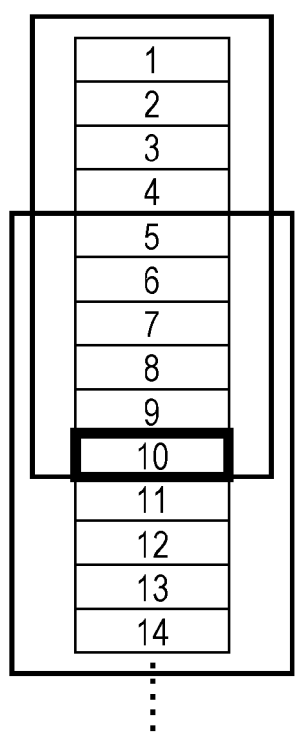
FIG. 9 is a diagram describing the provision of a special card upon 10-consecutive gacha.

FIG. 9 is a diagram describing the provision of a special card upon 10-consecutive gacha. The card box of the present embodiment is configured such that a plurality of game cards provided with serial numbers are selected in numerical order, and thus, whatever the timing of the player playing 10-consecutive gacha, any of the rare cards set for the nice round numbers of every 10 game cards is always selected. For example, at timing at which the player plays 10-consecutive gacha, regardless of whether the 1st to 10th game cards (10 game cards) in the card box are selected or the 5th to 14th game cards (10 game cards) are selected, the 10th rare card of a nice round number is provided.

In the nice round number gacha of the present embodiment, a plurality of card boxes, each having 309 game cards in a set, are prepared. When, as a result of playing nice round number gacha, the number of game cards selected in numerical order from a certain card box has reached 300, the card box is changed to a next card box. In other words, even when the number of game cards in a certain card box gradually decreases, eventually resulting in shortage of game cards, game cards can be provided continuously since the card box is changed to a next card box. Note that since card boxes, each having 309 game cards in a set, are changed one after another, they are the same as a card box in which super-rare cards are set for the nice round numbers of every 300 game cards.

Exemplary operation that is performed by the game system 1 according to the present embodiment to provide game cards to players who have played such nice round number gacha will be specifically described below.

<Exemplary Operation of Game System 1>

Exemplary operation of the game system 1 according to the present embodiment will be described. In the following, a card box setting process for setting a card box will be described, and then, a card provision process for providing a game card selected from the set card box to a player will be described.

(Card Box Setting Process)

In the game system 1 according to the present embodiment, before providing game cards to players, the control unit 11 (setting unit 111) of the server device 10 performs a card box setting process. Specifically, the setting unit 111 sets nice round numbers for providing special cards, for a card box. In the present embodiment, in a card box having 309 cards in a set, nice round numbers are set every 10 game cards, such as the 10th, 20th, and 30th game cards, and rare cards are set for those nice round numbers. A nice round number is also set for No. 300, and a super-rare card is set for that nice round number. Then, the setting unit 111 sets game cards associated with serial numbers from No. 1 to No. 309. Specifically, the setting unit 111 selects game cards with respective rarities by referring to the card information shown in FIG. 4, and associates the card IDs of rare cards or a super-rare card with the nice round numbers and associates the card IDs of common cards and uncommon cards with those numbers other than the nice round numbers. Then, the setting unit 111 generates a plurality of pieces of card box information (see FIG. 7), each corresponding to the card box set in the above-described manner, and records the plurality of pieces of generated card box information in the data storage unit 12.

(Card Provision Process)

In the game system 1 according to the present embodiment, after each card box is set by performing the above-described card box setting process, the control unit 11 (providing unit 113) of the server device 10 performs a card provision process.

Figure 10:
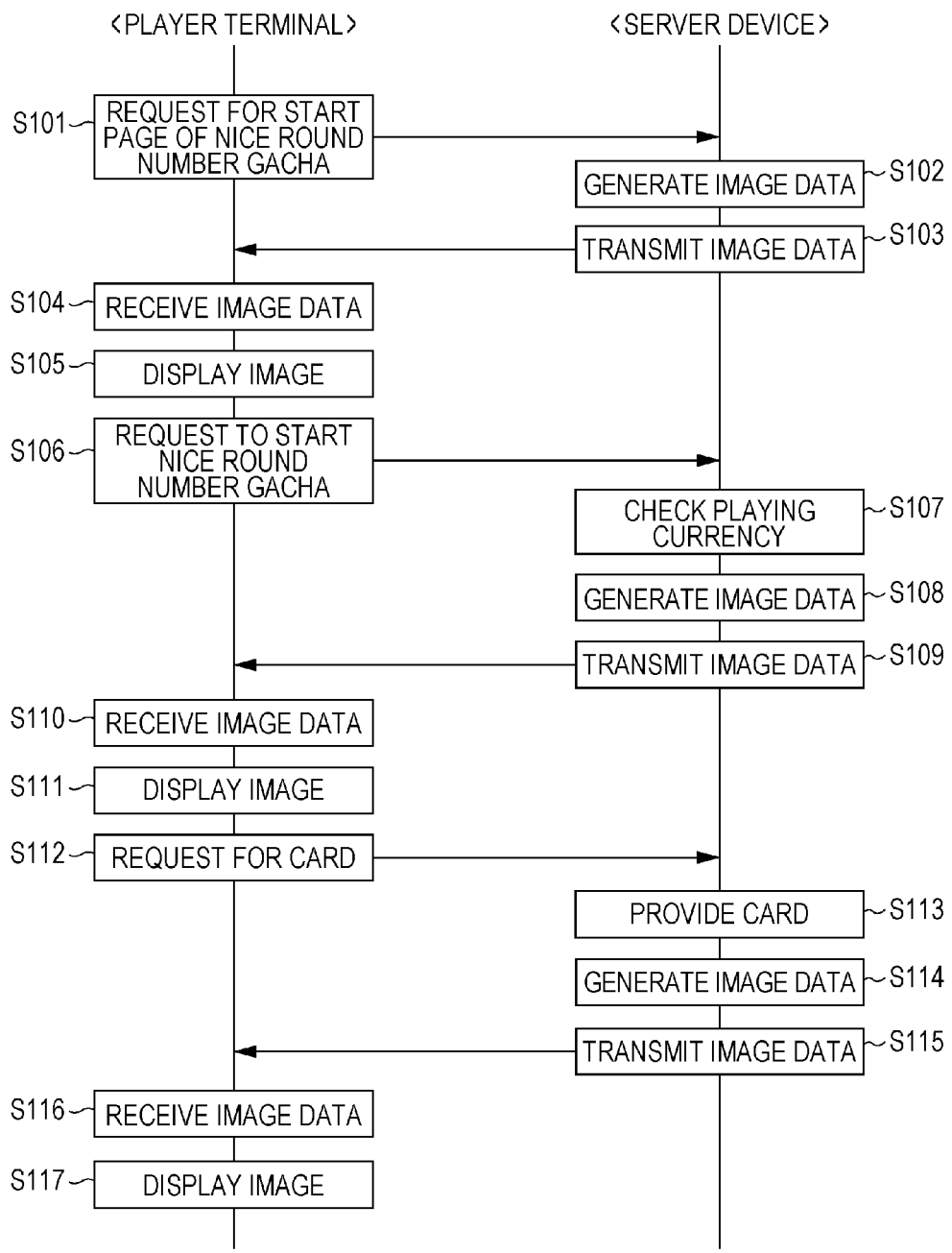
FIG. 10 is a flowchart for describing exemplary operation for providing a game card to a player in the game system according to the present embodiment.

FIG. 10 is a flowchart for describing exemplary operation for providing a game card to a player in the game system 1 according to the present embodiment.

First, in the player terminal 20, when the terminal control unit 21 receives a player's operation input from the terminal input unit 23, the terminal control unit 21 transmits a command for obtaining the start page of nice round number gacha (a request for the start page of nice round number gacha) to the server device 10 through the terminal communication unit 25 (S101).

Then, in the server device 10, when the accepting unit 112 accepts the request for the start page of nice round number gacha transmitted from the player terminal 20, the image data generating unit 115 generates image data for allowing the player terminal 20 to display the start page of nice round number gacha (game start screen) (S102).

Then, the communication unit 15 of the server device 10 transmits the image data of the start page of nice round number gacha generated by the image data generating unit 115, through the network 2 to the player terminal 20 which is the request source (S103).

Figure 11:
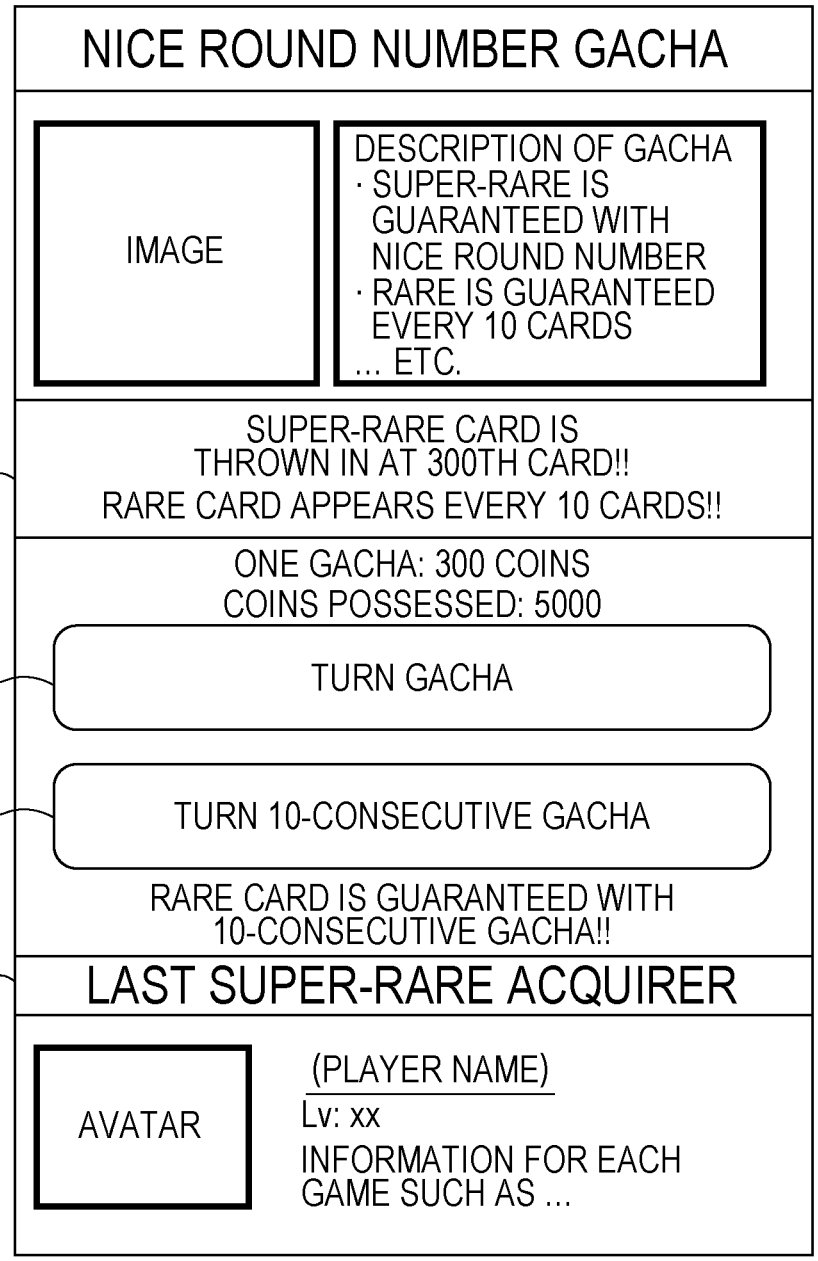
FIG. 11 is a diagram showing an example of a game screen before starting nice round number gacha.

Subsequently, when the player terminal 20 receives, through the terminal communication unit 25, the image data transmitted from the server device 10 (S104), the player terminal 20 allows the terminal display unit 24 to display the start page of nice round number gacha, based on the received image data (S105). FIG. 11 is a diagram showing an example of the start page of nice round number gacha. The start page of nice round number gacha contains at least information 51 about special cards that can be provided in nice round number gacha, an operation button for normal gacha 52, an operation button for 10-consecutive gacha 53, and information 54 about a player who has already acquired a special card. Note that the information 54 about a player who has already acquired a special card has a link so that players can access my page of the player.

Then, referring back to FIG. 10, when, while the terminal control unit 21 of the player terminal 20 is displaying the start page of nice round number gacha shown in FIG. 11 on the terminal display unit 24, the operation button for normal gacha 52 or the operation button for 10-consecutive gacha 53 is selected by the player operating the terminal input unit 23, a corresponding operation command (a request to start nice round number gacha) is transmitted from the player terminal 20 to the server device 10 (S106).

Then, when the control unit 11 of the server device 10 accepts, by the accepting unit 112, the request to start nice round number gacha transmitted from the player terminal 20, the control unit 11 checks the amount of coins owned by the player requesting to start nice round number gacha (S107). Specifically, when there is a request to start normal gacha (when the operation button for normal gacha 52 is selected), the control unit 11 determines whether the player owns 300 coins (the coins required for one normal gacha) or more, by referring to the player information stored in the data storage unit 12 (see FIG. 5). When there is a request to start 10-consecutive gacha (when the operation button for 10-consecutive gacha 53 is selected), the control unit 11 determines whether the player owns 3000 coins (the coins required for one 10-consecutive gacha, i.e., the coins required for 10 normal gacha) or more.

Then, when, as a result of the above-described determination, the control unit 11 of the server device 10 allows the start of nice round number gacha, the control unit 11 allows the image data generating unit 115 to generate image data of the confirmation page of nice round number gacha (a game screen for confirmation) (S108).

Then, the communication unit 15 of the server device 10 transmits the image data of the confirmation page of nice round number gacha generated by the image data generating unit 115, through the network 2 to the player terminal 20 which is the request source (S109).

Figure 12:
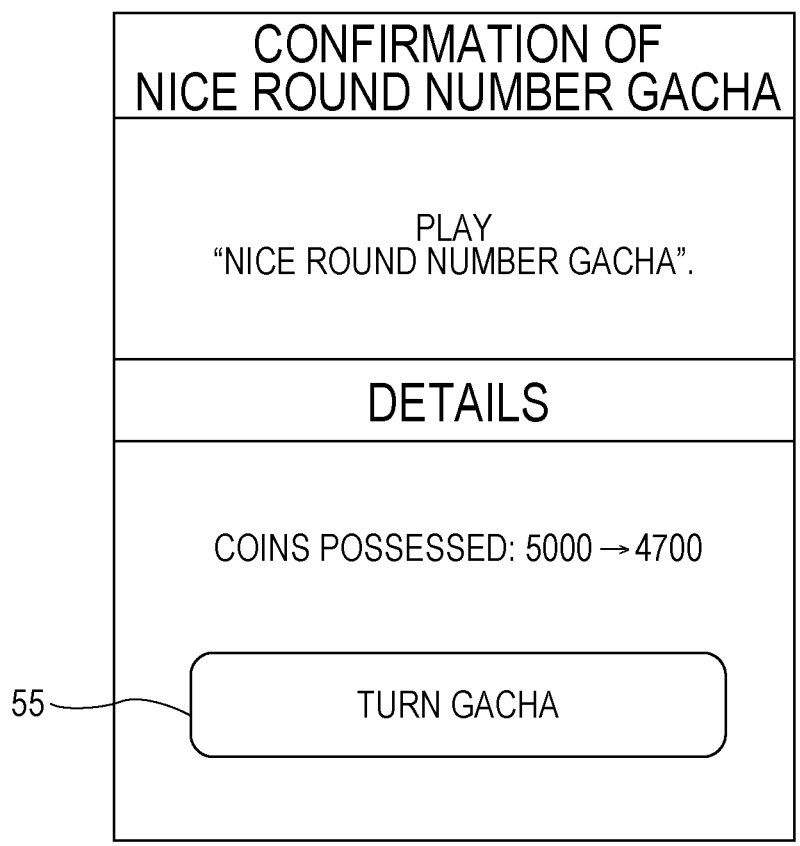
FIG. 12 is a diagram showing an example of a game screen confirming the start of nice round number gacha.

Subsequently, when the player terminal 20 receives, through the terminal communication unit 25, the image data transmitted from the server device 10 (S110), the player terminal 20 allows the terminal display unit 24 to display the confirmation page of nice round number gacha, based on the received image data (S111). FIG. 12 is a diagram showing an example of the confirmation page of nice round number gacha. Here, it is assumed that the operation button for normal gacha 52 is selected on the start page of nice round number gacha shown in FIG. 11, and as a result, as an operation button for confirmation, a confirmation button for normal gacha 55 is displayed on the confirmation page of nice round number gacha shown in FIG. 12.

Then, referring back to FIG. 10, when, while the terminal control unit 21 of the player terminal 20 is displaying the confirmation page of nice round number gacha on the terminal display unit 24, an operation button for confirmation (a confirmation button for normal gacha or a confirmation button for 10-consecutive gacha) is selected by the player operating the terminal input unit 23, a corresponding operation command (a card provision request) is transmitted from the player terminal 20 to the server device 10 (S112).

Then, when the control unit 11 of the server device 10 accepts, by the accepting unit 112, the card provision request transmitted from the player terminal 20, the control unit 11 allows the providing unit 113 to perform a nice round number gacha game process by consuming coins owned by the player (S113).

Figure 13:
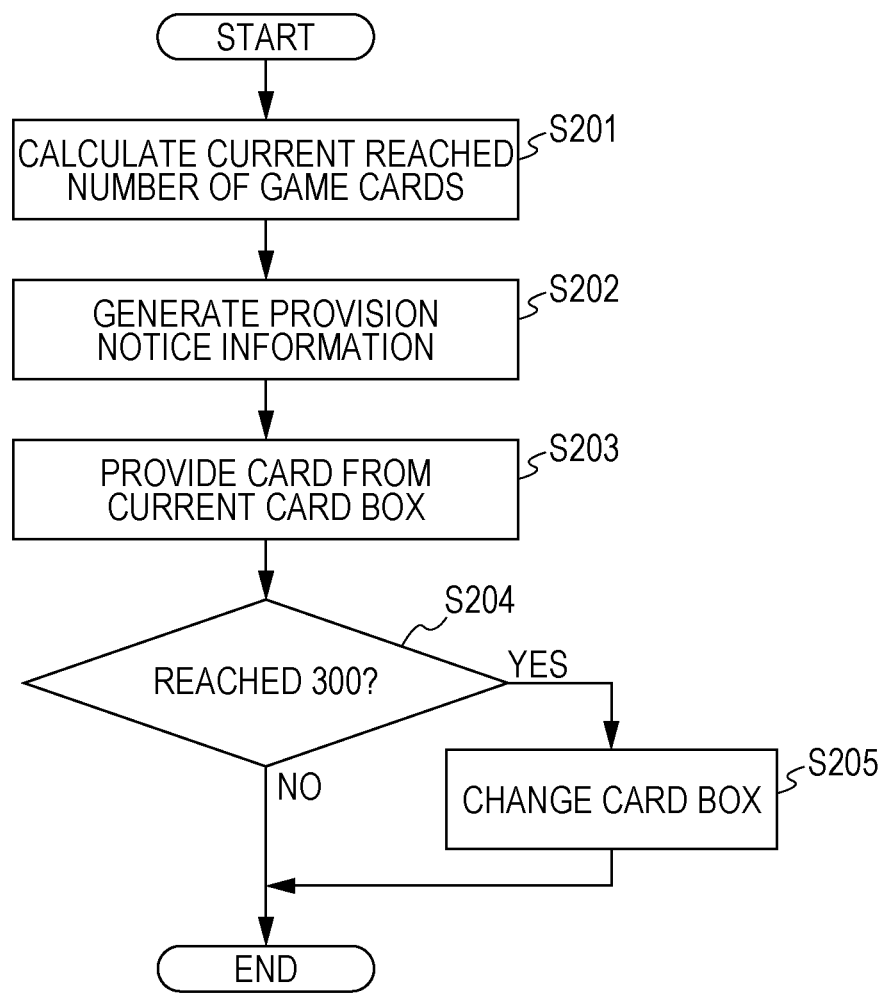
FIG. 13 is a flowchart for describing a nice round number gacha game process.

FIG. 13 is a flowchart for describing a nice round number gacha game process.

First, the providing unit 113 calculates the current reached number of game cards in the card box, which changes by providing a plurality of game cards selected in numerical order from the card box to players (the cumulative number of game cards provided so far) (S201). Specifically, the providing unit 113 reads, from the data storage unit 12, the cumulative number of already selected game cards in the card box. Then, when there is a card provision request for normal gacha, the providing unit 113 adds +1 to the read cumulative number, and when there is a card provision request for 10-consecutive gacha, the providing unit 113 adds +10 to the read cumulative number, whereby the current cumulative number is determined. Then, the providing unit 113 records the current cumulative number, which has been newly calculated in this manner, in the data storage unit 12 and thereby updates the cumulative number. For example, if there is a normal gacha request when the cumulative number for the card box is 267, then 1 card is provided to the player from the card box. As a result, the current reached number becomes 268. For example, if there is a 10-consecutive gacha request when the reached number for the card box is 258, then 10 cards are provided to the player from the card box. As a result, the current reached number becomes 268.

Subsequently, when the current reached number of game cards in the card box has been calculated, the provision notice information generating unit 114 generates provision notice information for notifying in advance of whether a special card set for a nice round number is to be provided (S202). For example, when the current reached number of game cards is calculated to be 268, the provision notice information generating unit 114 of the present embodiment generates, as an example of provision notice information, information indicating the position of the current reached number in the entire card box (e.g., "268/309") or information indicating the number of cards to go until a nice round number for which a super-rare card is set (e.g., 32 cards to go until the 300th card) or information indicating the number of cards to go until a nice round number for which a rare card is set (e.g., 2 cards to go until the 270th card).

Then, the providing unit 113 provides a game card selected in numerical order from the card box by referring to the card box information stored in the data storage unit 12 (see FIG. 7), to the player (S203). In the case of normal gacha, the providing unit 113 provides 1 game card selected in numerical order from the current card box, to the player. In the case of 10-consecutive gacha, the providing unit 113 provides 10 game cards selected in numerical order from the current card box, to the player. In the case of this 10-consecutive gacha, since the number of cards provided at a time in 10-consecutive gacha (10 cards) is set to the same number as the number of the intervals between nice round numbers for rare cards (every 10 game cards), a rare card is always included in the provided 10 cards (a rare card is guaranteed). When the game card is provided to the player in this manner, the owned card information shown in FIG. 6 is updated (the player acquires a card).

The reason why the number of game cards contained in the card box is thus set to 309 is as follows. That is, if the number of game cards contained in the card box is set to 300 which is a nice round number, then when 10-consecutive gacha is played at the time when the reached number of game cards in the card box is 299, 9 cards are short and thus cannot be provided. Hence, the maximum number of the cards (No. 309) in the card box is set to a numerical value (309) which is obtained by adding the number of cards provided in 10-consecutive gacha (10 cards) to the maximum nice round number (No. 300) (310) and then subtracting 1 from the added value. In this manner, the cards with No. 301 to No. 309 can be provided, avoiding a situation in which cards being short are not provided in the middle of 10-consecutive gacha.

Then, the providing unit 113 determines whether the cumulative number of provided game cards has reached 300 as a result of providing a game card in the card box in numerical order (S204). That is, the providing unit 113 determines whether the 300th super-rare card has been provided to the player.

If not reached 300 (S204: NO), then the providing unit 113 continuously and sequentially selects game cards from the current card box at the next and subsequent times, too, without changing the card box to a new one.

On the other hand, if reached 300 (S204: YES), then the providing unit 113 changes the current card box to a next new card box, based on the card box information shown in FIG. 7 (S205). For example, when 10-consecutive gacha is played at the time when the reached number of game cards in the card box is 295, the providing unit 113 provides game cards up to the 305th game card from the current card box, and then changes the current card box to a next card box. Then, after giving a 5-minute suspension time, the providing unit 113 performs nice round number gacha using the changed new card box, and sequentially provides game cards. Note that when the control unit 11 of the server device 10 accepts, by the accepting unit 112, a request to start nice round number gacha transmitted from the player terminal 20 during this suspension time, the control unit 11 transmits to the terminal display unit 24 an image indicating that the card box is being changed, and the terminal display unit 24 displays the image.

By thus giving the suspension time upon changing the card box, the player can recognize that the card box has been changed to a new card box.

In addition, since the numerical values of nice round numbers are smaller when a card box is thus changed to a new card box one after another in units of 300 cards than when one card box is continuously used without changing it to a new one, players can more easily grasp nice round numbers.

Then, referring back to FIG. 10, after such a nice round number gacha game process ends, the control unit 11 of the server device 10 allows the image data generating unit 115 to generate image data of the start page of next nice round number gacha (next game start screen) (S114).

Then, the communication unit 15 of the server device 10 transmits the image data of the start page of next nice round number gacha generated by the image data generating unit 115, through the network 2 to the player terminal 20 which is the request source (S115).

Figure 14:
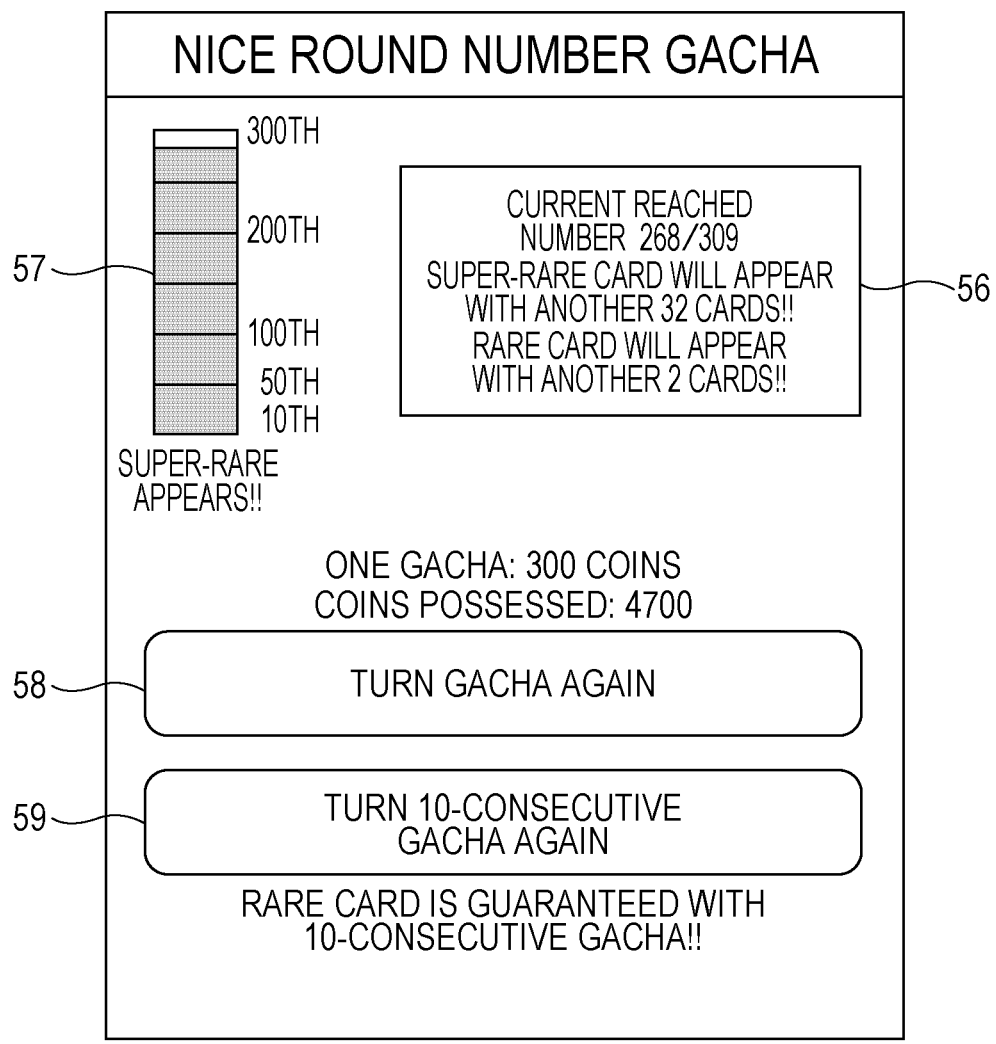
FIG. 14 is a diagram showing another example of a game screen before starting nice round number gacha again.

Subsequently, when the player terminal 20 receives, through the terminal communication unit 25, the image data transmitted from the server device 10 (S116), the player terminal 20 allows the terminal display unit 24 to display the start page of next nice round number gacha, based on the received image data (S117). FIG. 14 is a diagram showing an example of the start page of next nice round number gacha. The start page of next nice round number gacha contains at least text 56 indicating the current reached number ("268/309") and the number of cards to go until a nice round number ("super-rare card will appear with another 32 cards!!" and "rare card will appear with another two cards !!") as examples of provision notice information; a gauge 57 indicating the current reached number as an example of provision notice information; a reoperation button for normal gacha 58; and a reoperation button for 10-consecutive gacha 59.

As described above, unlike the start page of nice round number gacha shown in FIG. 11, the start page of next nice round number gacha shown in FIG. 14 displays provision notice information. That is, after the player has played nice round number gacha by consuming coins, provision notice information is displayed on the start page of nice round number gacha. As such, only to the player having satisfied a predetermined condition, provision notice information for notifying in advance of whether game cards with nice round numbers are to be provided is displayed on the start page of nice round number gacha. Therefore, since players to whom provision notice information is shown in advance are limited to those having satisfied the predetermined condition, frequent access to the server is prevented, resulting in a reduction in server load.

Other Embodiments

The above-described embodiment is provided to facilitate understanding of the present invention and not to be construed as limiting the present invention. The present invention may be changed or modified without departing from the spirit and scope thereof, and also includes equivalency thereof. In particular, even those embodiments described below are included in the present invention.

<Card Boxes>

Figure 15:
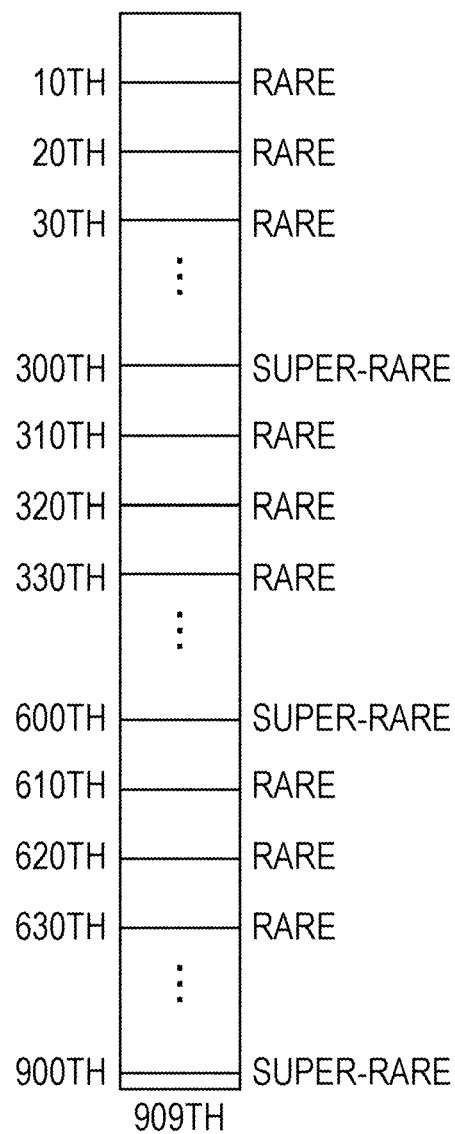
FIG. 15 is another conceptual diagram of a card box.

The above embodiment has been described using an example in which, as shown in FIG. 8, a card box contains 309 game cards or the nice round numbers of every 10 game cards are set in the card box or the nice round numbers of every 300 game cards are set in the card box. However, the present invention is not limited to those numerical values. For example, a configuration of a card box shown in FIG. 15 may be employed. Specifically, a card box contains 909 game cards which is larger in number than 309 and rare cards are set for the nice round numbers of every 10 game cards, such as the 10th, 20th, and 30th cards, and super-rare cards are set for the nice round numbers of the 300th, 600th, and 900th cards. Then, at the time when the reached number of game cards in the card box has reached 900, the card box is changed to a next card box. This can reduce the number of changes of card boxes compared to the configuration of the card box shown in FIG. 8, and thus, is effective for nice round number gacha with a high frequency of use, such as nice round number gacha using game cards of popular characters. Note that, in this case, the intervals between nice round numbers for which super-rare cards are set may be set to any random value (number of game cards).

Figure 16A:
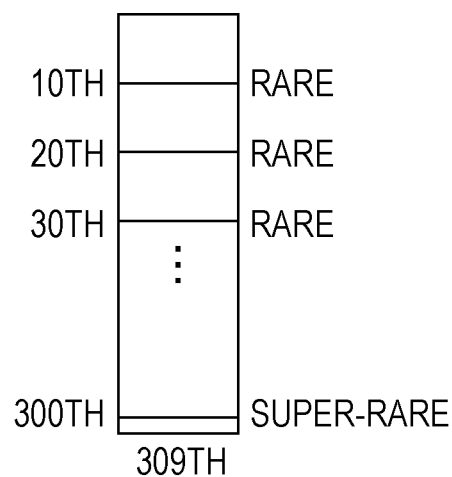
FIG. 16A is a conceptual diagram of a card box for the case of consuming coins.
Figure 16B:
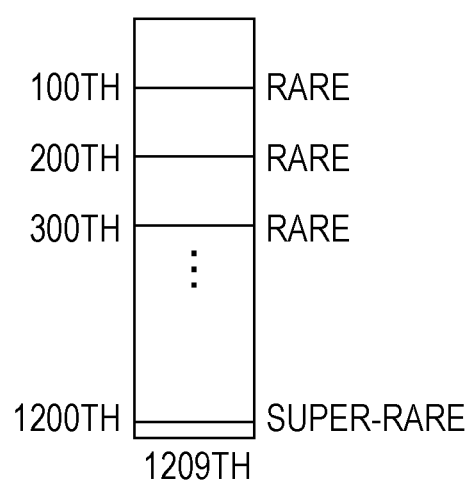
FIG. 16B is a conceptual diagram of a card box for the case of not consuming coins.

In addition, the above embodiment has been described using, as an example, the case in which a player plays nice round number gacha by consuming coins; however, the present invention is not limited thereto, and nice round number gacha may be played without consuming coins. In this case, the probability of the player being able to acquire a special card may be set to a higher value for the case of consuming coins than for the case of not consuming coins. For example, a card box shown in FIG. 16A may be used for nice round number gacha with coins consumed, and a card box shown in FIG. 16B may be used for nice round number gacha with coins not consumed. Specifically, larger intervals between nice round numbers are taken in the latter than the former to reduce the appearance rate of special cards. In addition, in nice round number gacha with coins consumed, a plurality of card boxes whose nice round numbers vary according to the amount of coins consumed may be set. For example, the setting may be such that a card box with a larger amount of coins consumed has a smaller number of nice round numbers. In this manner, the server load can be reduced.

In addition, in the above-described embodiment, a plurality of card boxes may be prepared according to the types of game cards (the types of characters) provided to players (card box information may be registered in a storage unit). In this manner, since the respective card boxes have different reached numbers of game cards, players can enjoy nice round number gacha while searching for a card box that is more likely than others to provide a special card with a nice round number.

<Nice Round Numbers>

Although the above embodiment has been described using, as an example, nice round number gacha in which special cards are provided using the nice round numbers of game cards contained in a card box, the present invention is not limited thereto. The number of battles (which may be the number of wins or the number of losses) in a battle game may be counted, and special cards may be provided using the nice round numbers of the number of battles (or the number of wins or the number of losses).

In addition, although the above embodiment has been described using, as an example, the case in which nice round numbers (special numbers) are set every predetermined interval such as Nos. 10, 20, 30 . . . , the predetermined interval is not limited to this numerical value.

In addition, in the present embodiment, special cards are not limited to being set to nice round numbers having a predetermined interval. For example, while rare cards are set for nice round numbers having a predetermined interval such as Nos. 10, 20, 30 . . . , a rare card can also be exceptionally set for, for example, No. 13. Alternatively, for example, while rare cards are set for nice round numbers having a predetermined interval such as Nos. 10, 20, 30 . . . , a common card may be exceptionally set for, for example, the nice round number of No. 40.

<Predetermined Condition>

Although the above embodiment has been described using, as an example, the case in which provision notice information is displayed on a game screen based on a predetermined condition that a player plays nice round number gacha by consuming coins, the present invention is not limited thereto. For example, the predetermined condition may be that nice round number gacha is played without consuming coins. Alternatively, the predetermined condition may be that a player wins a battle against an enemy character in a game event. Alternatively, the predetermined condition may be that a player accesses a server during a certain limited period or certain limited hours. Alternatively, the predetermined condition may be that a player uses a special item. Alternatively, the predetermined condition may be that a player wins a battle against enemy characters in units of groups formed with other players, and provision notice information may be displayed to all players belonging to the group.

<Server Device>

Although the above embodiment has been described using, as an example, the game system 1 including a single server device 10 as an example of an information processing apparatus, the present invention is not limited thereto, and the game system 1 may include a plurality of server devices 10. Specifically, a plurality of server devices 10 may be connected to each other through the network 2, and the server devices 10 may perform various types of processes in a distributed manner. Alternatively, a player terminal 20 may be configured to perform some of the functions of the server device. In this case, the server device 10 and the player terminal 20 constitute an information processing apparatus.

<Virtual Currency>

In the above-described embodiment, a fixed amount of coins, which are an example of virtual currency, may be provided to each player periodically, but the present invention is not limited thereto, and the coins may be set arbitrarily. For example, a player may purchase coins. Alternatively, coins may be provided to a player according to communication made with other players.

What is claimed is:

1. A server apparatus connected to a player terminal so as to be able to communicate information with the player terminal, the server apparatus comprising:
 a storage unit that stores game content information in which rarities are set to be respectively associated with a plurality of game contents provided with serial numbers, the game content information being configured such that rarities associated with game contents with special numbers are higher than or equal to rarities associated with game contents with numbers other than the special numbers;
 a providing unit that provides at least one game content in response to a request from the player terminal, and calculates a subtraction value by subtracting a cumulative numerical value of a number of already-provided game contents from a numerical value of a maximum special number, the at least one game content being selected in numerical order from among the plurality of game contents, based on the game content information;
 a provision notice information generating unit that generates, based on the subtraction value, provision notice information that notifies in advance of a number of game contents left before provision of a game content with the maximum special number; and
 an image data generating unit that generates image data for displaying a game screen on the player terminal before providing the game content, the game screen containing the provision notice information.

2. The server apparatus according to claim 1, wherein
 the game content information is configured to have special numbers at a predetermined interval in serial number order, and
 the providing unit selects, based on the game content information, game contents whose number is same as a number of the predetermined interval, in numerical order from among the plurality of game contents, and provides the selected game contents at a time.

3. The server apparatus according to claim 2, wherein
 a numerical value of a maximum number among the serial numbers provided to the game contents is obtained by adding a number of a plurality of game contents provided at a time by the providing unit to the numerical value of the maximum special number and then subtracting 1 from the numerical value obtained after the addition, and
 when the providing unit provides, at a time, a plurality of game contents including the game content with the maximum special number, the providing unit can provide game contents with numbers from one subsequent to the maximum special number to the maximum number.

4. A non-transitory computer-readable storage medium storing a game program that causes a server apparatus connected to a player terminal so as to be able to communicate information with the player terminal, to implement:
 a function of storing, in a storage unit, game content information in which rarities are set to be respectively associated with a plurality of game contents provided with serial numbers, the game content information being configured such that rarities associated with game contents with special numbers are higher than or equal to rarities associated with game contents with numbers other than the special numbers;
 a providing function of providing at least one game content in response to a request from the player terminal, and calculating a subtraction value by subtracting a cumulative numerical value of a number of already-provided game contents from a numerical value of a maximum special number, the at least one game content being selected in numerical order from among the plurality of game contents, based on the game content information;
 a provision notice information generating function of generating, based on the subtraction value, provision notice information that notifies in advance of a number of game contents left before provision of a game content with the maximum special number; and
 an image data generating function of generating image data for displaying a game screen on the player terminal before providing the game content, the game screen containing the provision notice information.

* * * * *